United States Patent
Eastlack

(10) Patent No.: US 9,071,076 B2
(45) Date of Patent: *Jun. 30, 2015

(54) LIMITATION OF VAMPIRIC ENERGY LOSS WITHIN A WIRELESS INDUCTIVE BATTERY CHARGER

(71) Applicant: Jeffrey R. Eastlack, Austin, TX (US)

(72) Inventor: Jeffrey R. Eastlack, Austin, TX (US)

(*) Notice: Subject to any disclaimer, the term of this patent is extended or adjusted under 35 U.S.C. 154(b) by 307 days.

This patent is subject to a terminal disclaimer.

(21) Appl. No.: 13/746,331

(22) Filed: Jan. 22, 2013

(65) Prior Publication Data

US 2013/0187596 A1    Jul. 25, 2013

Related U.S. Application Data

(60) Provisional application No. 61/589,388, filed on Jan. 22, 2012.

(51) Int. Cl.
*H02J 7/00* (2006.01)
*H02J 7/02* (2006.01)
*H01R 43/00* (2006.01)
*H02J 5/00* (2006.01)

(52) U.S. Cl.
CPC ............... *H02J 7/025* (2013.01); *H01R 43/00* (2013.01); *Y10T 29/49117* (2015.01); *H02J 5/005* (2013.01)

(58) Field of Classification Search
CPC .................................. H02J 5/005; H02J 7/025
USPC ................. 320/107–109, 134–140, 152, 157
See application file for complete search history.

(56) References Cited

U.S. PATENT DOCUMENTS

| | | |
|---|---|---|
| 2010/0001684 A1 | 1/2010 | Eastlack |
| 2010/0001685 A1 | 1/2010 | Eastlack |
| 2010/0225273 A1 | 9/2010 | Eastlack |
| 2011/0050170 A1 | 3/2011 | Eastlack |
| 2013/0093381 A1* | 4/2013 | McGinley et al. ............ 320/107 |

\* cited by examiner

*Primary Examiner* — Paul Dinh
(74) *Attorney, Agent, or Firm* — Andrew Alia, Esq.

(57) ABSTRACT

Vampire energy loss occurs when an electronic or mechanical machine consumes energy while not being utilized for any useful purpose. Vampire energy losses in consumer electronic devices are under intense scrutiny for needlessly wasting an estimated 20% of the electric power production in the United States. It is also estimated by the US Department of Energy that by 2015 vampire electronics could be responsible for nearly 30 percent of the total household power consumption in the United States. Smarter vampire proof technologies are needed to address this growing problem.

20 Claims, 8 Drawing Sheets

… … …

LIMITATION OF VAMPIRIC ENERGY LOSS WITHIN A WIRELESS INDUCTIVE BATTERY CHARGER

CROSS REFERENCE TO RELATED APPLICATION

This application claims the benefit of U.S. Provisional Application No. 61/589,388, filed on Jan. 22, 2012, which is hereby incorporated by reference in its entirety.

BACKGROUND

The basic DC power supply or battery charger plugs into an AC source via a wall receptacle and employs the use of a step-down transformer 104, signal rectification circuitry 106, and voltage regulation circuitry 108 as shown in FIG. 1. The transformer consists of two conductively independent coils that are mutually coupled by magnetic flux when current flows in one of them. The AC current flowing in the primary coil produces a changing magnetic field within the transformer core and there by induces an electric current in the secondary coil as described by Faraday's Law.

From transformer theory "no-load loss" is when energy loss occurs even when the secondary coil is left open or not attached to a load. According to academic literature the cause of no-load loss is attributed to eddy currents and magnetic hysteresis within the transformer core. In addition to no-load loss from the transformer, DC power supplies also incur dynamic and static power loss within the rectification and regulation circuitry. All of these combined losses within the DC power supply attribute to a significant portion of "vampire energy loss" which exists in many electronic product domains.

In recent years a new type of wireless charging technology has emerged in which may employ the use of an additional magnetic induction stage with the secondary circuit components housed on the target device to establish magnetic flux linkage with the second stage primary shown in 218. In this scenario additional components of Vampire Energy Loss (VEL) may be introduced to the circuit as shown in FIG. 2. In this scenario power to the device to be charged is transmitted via magnetic coupling from a primary coil on the power transmission unit 218 with a secondary coil on the target 220. In addition to the added components that may introduce more VEL, the power conversion efficiency may suffer significantly from potential loss in the magnetic flux linkage from the primary coil on the power transmission unit with a secondary coil on the target.

Techniques have been in place to reduce no-load loss within transformers and parasitic loading of electronic devices; however the most effective way to stop no-load loss from the device charger is to take the DC power supply or battery charger completely off of the power grid.

PRIOR ART

With the design of the vampire labs' vampire proof charger application titled "Limitation of vampiric power consumption with decoupling of an inductive power apparatus and an alternating current power source" U.S. patent application Ser. No. 12/497,859 and related provisional patent application 61/078,365 the charger control circuit works by sensing and detecting the charge state of the battery. Once the battery is charged the control circuit disconnects the charger from the power grid via a relay and thus different detection and decoupling mechanisms are used. A user behavior change is required, such as pressing a push button switch to initiate a charge sequence.

The application titled "Automatic coupling of an alternating current power source and an inductive power apparatus to charge a target device battery" patent application Ser. No. 12/511,069 and related provisional application No. 61/084,616 uses electronic control mechanism on the target device to determine shutdown.

The application titled "Electromechanical Vampire Proof Charging system" patent application Ser. No. 12/709,502 and related provisional application No. 61/154,414 uses a physical or mechanical connection from signal ports from the charger to the target to initiate a charge session. Physical coupling is required to complete the circuit from the AC power source to the charger's power conversion circuit.

The application titled "Electromechanical Vampire Proof Charger" patent application Ser. No. 12/718,122 and related provisional application No. 61/157,565 uses physical contact from the target device to trigger a switch to the circuit from the AC power source to the charger's power conversion circuit.

FIELD OF INVENTION

This invention relates to power efficient battery chargers, inductive power transmission unit chargers, and technology that limit vampire energy loss using magnetic field proximity switches.

SUMMARY

In an embodiment, the vampire proof wireless inductive charging system is designed to eliminate VEL when the target device is not present on the power transmission unit described in 316 and 402. This said invention employs the use of a reed switch or magnetic switch on the power transmission unit and a small ferromagnetic component embedded on the device or within a protective case. The reed switch 304 will electrically close when in the ambient presence of a correctly oriented magnetic field that is provided by the ferromagnetic component or permanent magnet 306 shown in FIG. 3.

The Vampire Proof wireless inductive device battery charging system eliminates vampire energy loss in this particular application domain which includes the "no load loss" of the step down transformer 104, static and dynamic power consumption of the rectification 106, regulation 108 circuitry, inversion circuitry 202 and the second stage rectification 206 and regulation circuitry 208 that may exist within a wireless inductive charging system shown in FIG. 2.

The Vampire Proof circuitry proposed in this invention disclosure has been designed to be integrated as add on circuitry to existing wireless inductive charging system such as future charger designs or aftermarket additions to existing mobile device battery chargers illustrated by FIG. 4 and FIG. 7 which shows how the components can be realized within different enclosures within the same circuit. The concept of this invention can be extended to include many other battery operated products that require frequent battery charging including the additional products described in FIG. 6.

DETAILED DESCRIPTION

Figure 1:
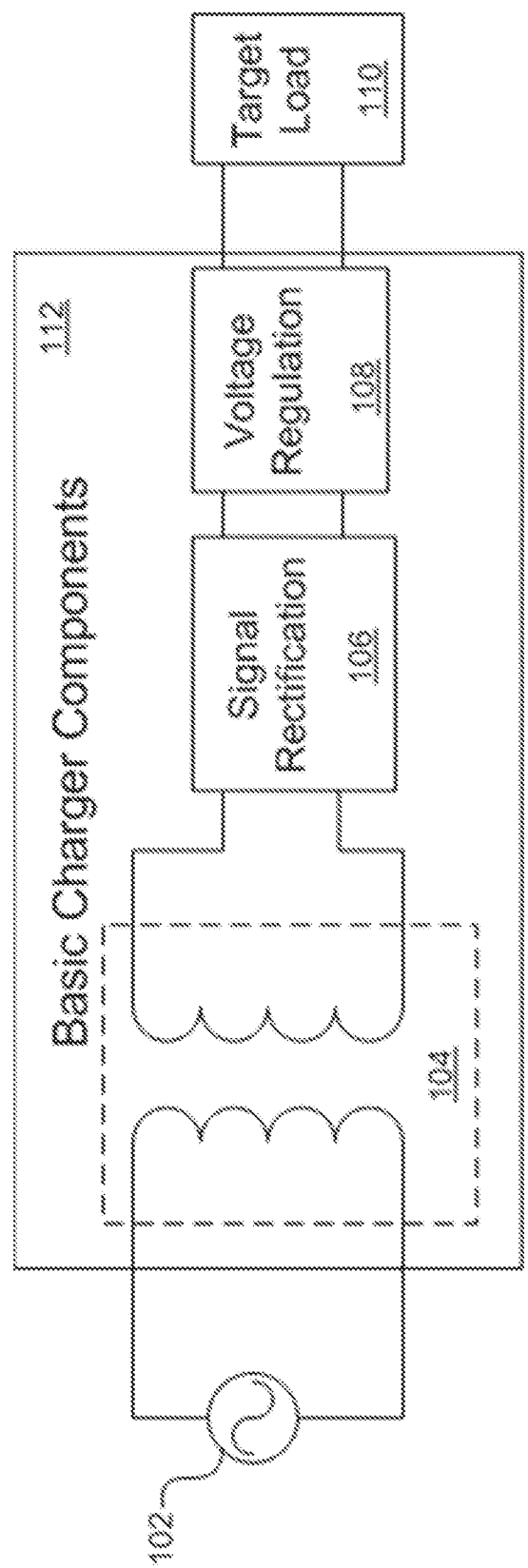
FIG. 1 shows the basic components of a typical wired battery charger how they exist today.
Figure 2:
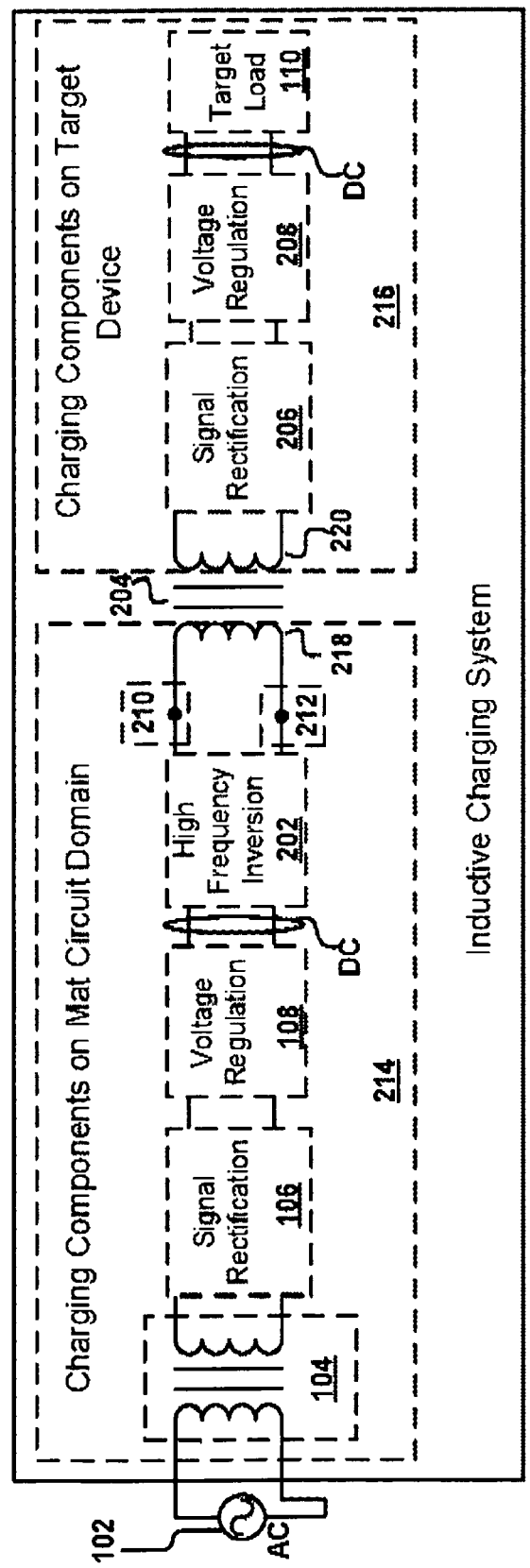
FIG. 2 shows the basic electrical components of a simple wireless inductive charging system, according to an embodiment.

The Vampire Proof wireless inductive charging system circuit employs the use of a "reed switch" or magnetic sensor 302 to detect the presence of a magnetic field that is provided by the target device 310. When a reed switch is in the presence of a correctly oriented magnetic field shown in 304 and 410 the switch will either electrically open or close depending on the configuration of the reed switch. In this invention, the reed switch 302 will be in the normally open configuration.

The magnetic field may be provided by using an electromagnet or permanent magnet composed of some ferromagnetic material as shown as a circuit component in 306 and physically in 410. The permanent magnet shown in 410 is external, but may be realized internal to the device enclosure. For internal realization the enclosure material must have low enough diamagnetic properties and the magnet field strength shown as 414 must be high enough to extend the extra distance to electrically close the reed switch 302 shown in the circuit of FIG. 3 and in the area of section 406 of the power transmission unit 316 and 402 which depicts the consideration of spatial proximity to the permanent magnets 306 and 410. The area outlined in section 406 of FIG. 4 is intended to describe the placement of the reed switch 302 within the power transmission unit 402 so that it's placement is such that it lines up with the magnetic field 414 provided by the target device 404 in order to trigger the reed switch to the closed circuit state as described temporally in 506.

Figure 3:
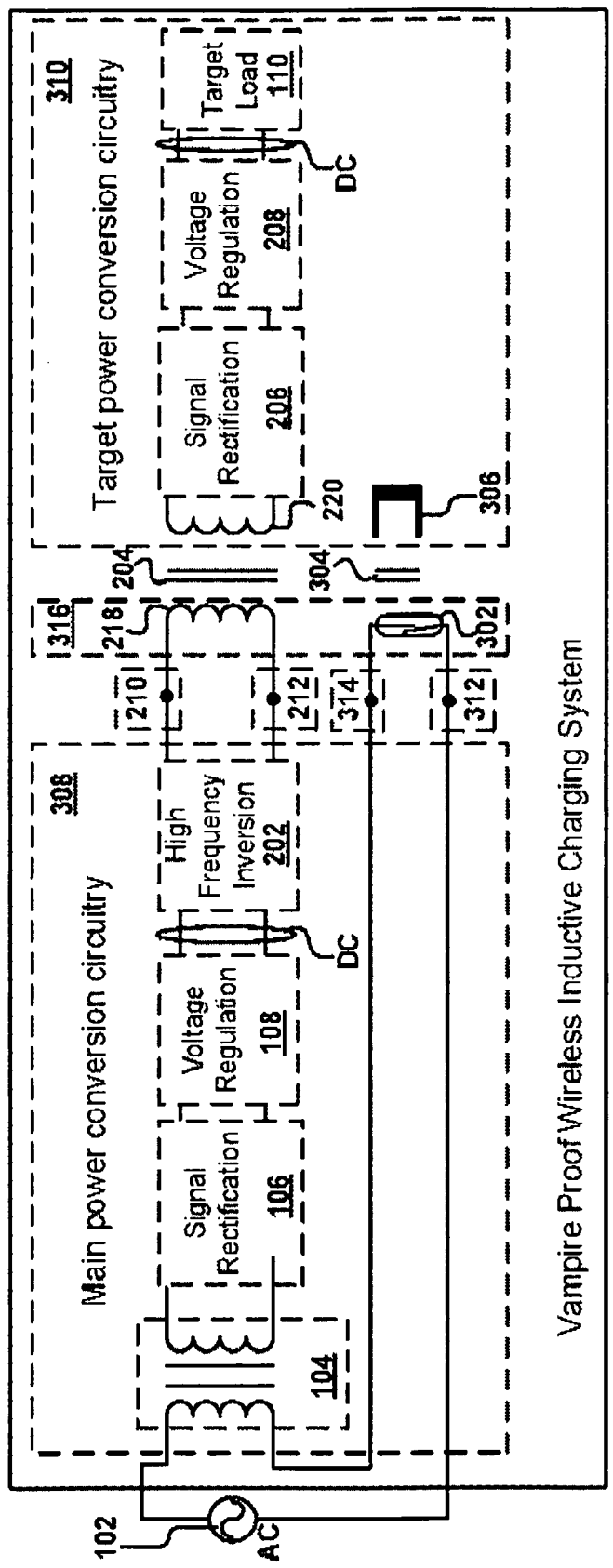
FIG. 3 shows the basic wireless inductive charging system circuit components of FIG. 2 augmented with circuit components, according to an embodiment.
Figure 4:
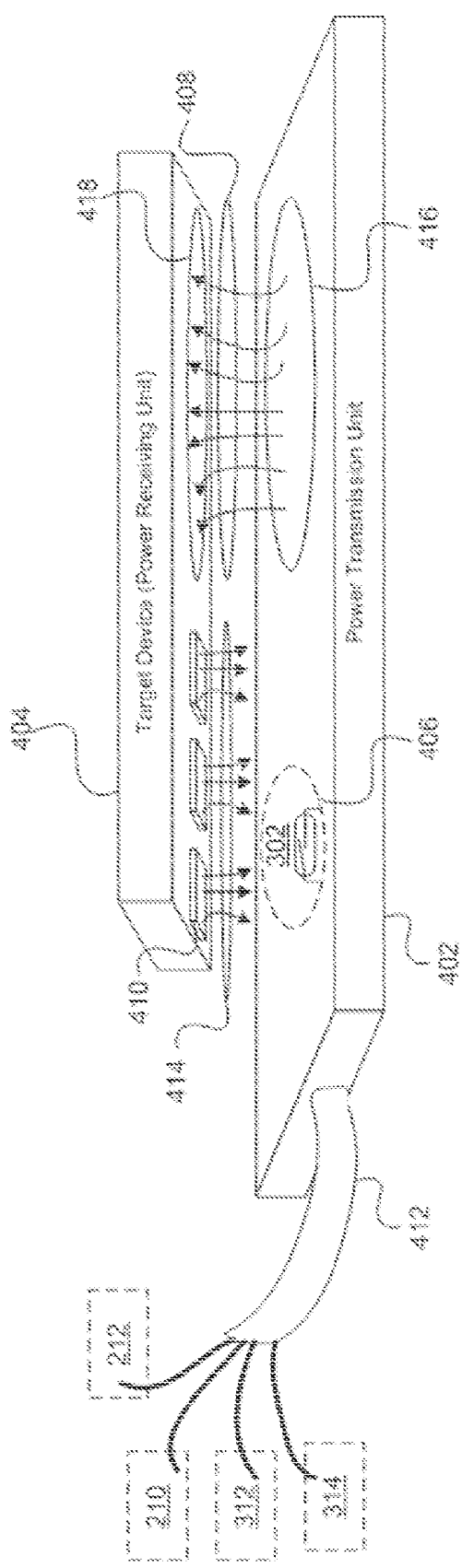
FIG. 4 shows a possible realization and placement of the power transmission components 316 shown in FIG. 3 to enable flux linkage between the permanent magnet on the target device with the reed switch on the power conversion circuit, according to an embodiment.
Figure 5:
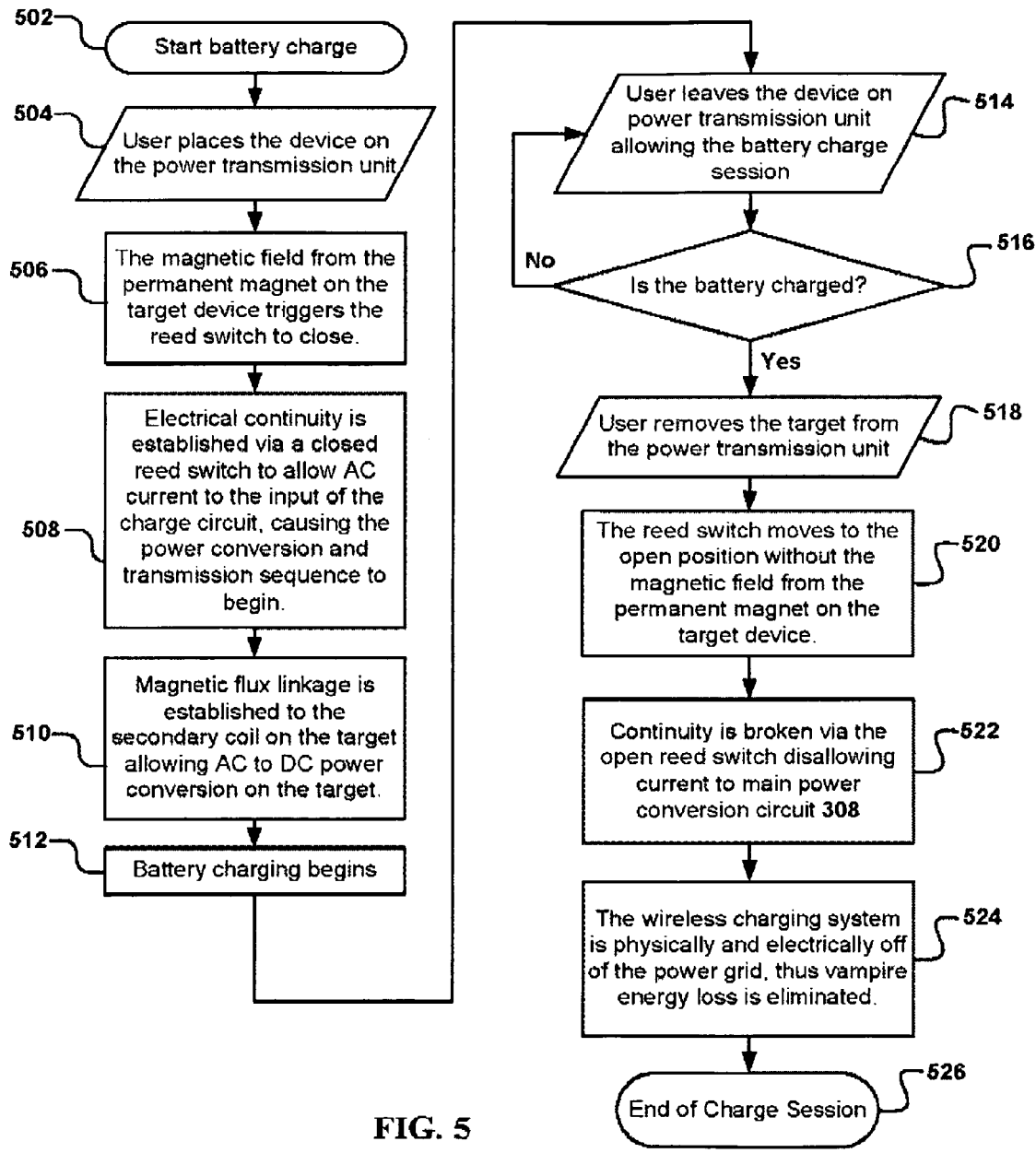
FIG. 5 shows a usage flow chart that illustrates temporal operation between the user and the vampire proof wireless inductive charging system, according to an embodiment.
Figure 6:
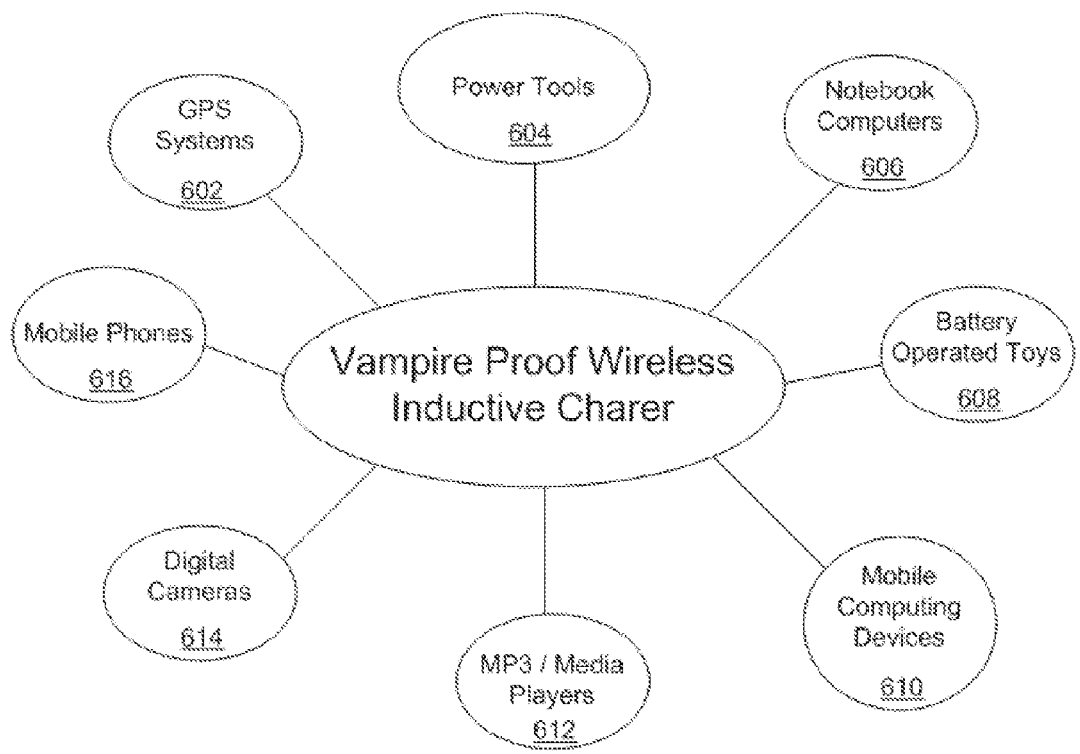
FIG. 6 illustrates how the invention concept could be expanded to other battery operated products, according to an embodiment.
Figure 7:
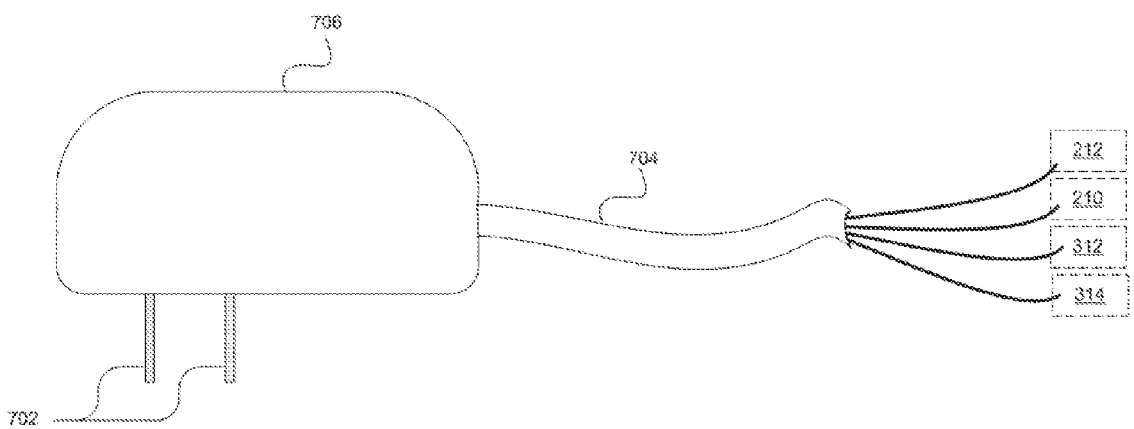
FIG. 7 illustrates how the main charging components of 308 could be realized within a standard enclosure with the main power and control signal 210, 212, 312, and 314 could be routed to the main power transmission unit 316 shown in FIG. 3 and FIG. 4, according to an embodiment.

A basic inductive charging circuit like the one shown in FIG. 3 can be slightly augmented with the proposed vampire proof circuit by routing power from the AC power source 102 to the input connector ports 312 and 314 of the reed switch 302. The reed switch 302 will toggle to the electrically closed state with the presence of a magnetic field shown by 304 and spatially by 414. With the reed switch 302 in the closed state, AC current will be allowed to flow from port 312 to port 314 and on to the AC power input of the wireless inductive charging system thus initiating the power conversion and transmission sequence.

To initiate a charge session 502, the power transmission circuit 316 shown in FIG. 3 must be physically connected to an AC power source. Next the target device with the inductive charge circuit components as shown in 310 must be placed on the power transmission unit 402 and is depicted temporally in step 504. The magnetic field 414 introduced by the permanent magnets of 410 and 306 will switch the normally open reed switch to the closed position as described in step 506 allowing the power conversion and transmission process to begin.

The DC power conversion process begins on the target once energy in the form of magnetic flux linkage 204 and 408 is transmitted via induction between primary coil 218 of the power transmission unit and secondary coil 220 of the target device as shown in FIG. 3 and temporally step 510. At this point charging begins and the wireless inductive charging circuit will remain the electrical power grid until the user removes the device from the power transmission unit 402 in step 516. With the target device removed from the power transmission unit, magnetic linkage from the permanent magnet 306 and 414 will be removed, thus causing the reed switch 302 to change to the electrically open state disallowing AC current to flow to the input of the main power conversion circuit 308 and thus eliminating vampire energy loss by electrically removing the wireless inductive charging system from the power grid.

With the proposed invention spatial considerations regarding the placement of the magnetic components should be understood. The permanent magnets 410 shown and reed switch location 406 must be placed within a close proximity of each other in order for the reed switch 302 to close as described in step 506. To increase the chances of flux linkage between the permanent magnets 308/410 and the reed switch 302 a plurality of either permanent magnets 308 or plurality of reed switches 302 may be introduce in parallel to the circuit.

Figure 8:
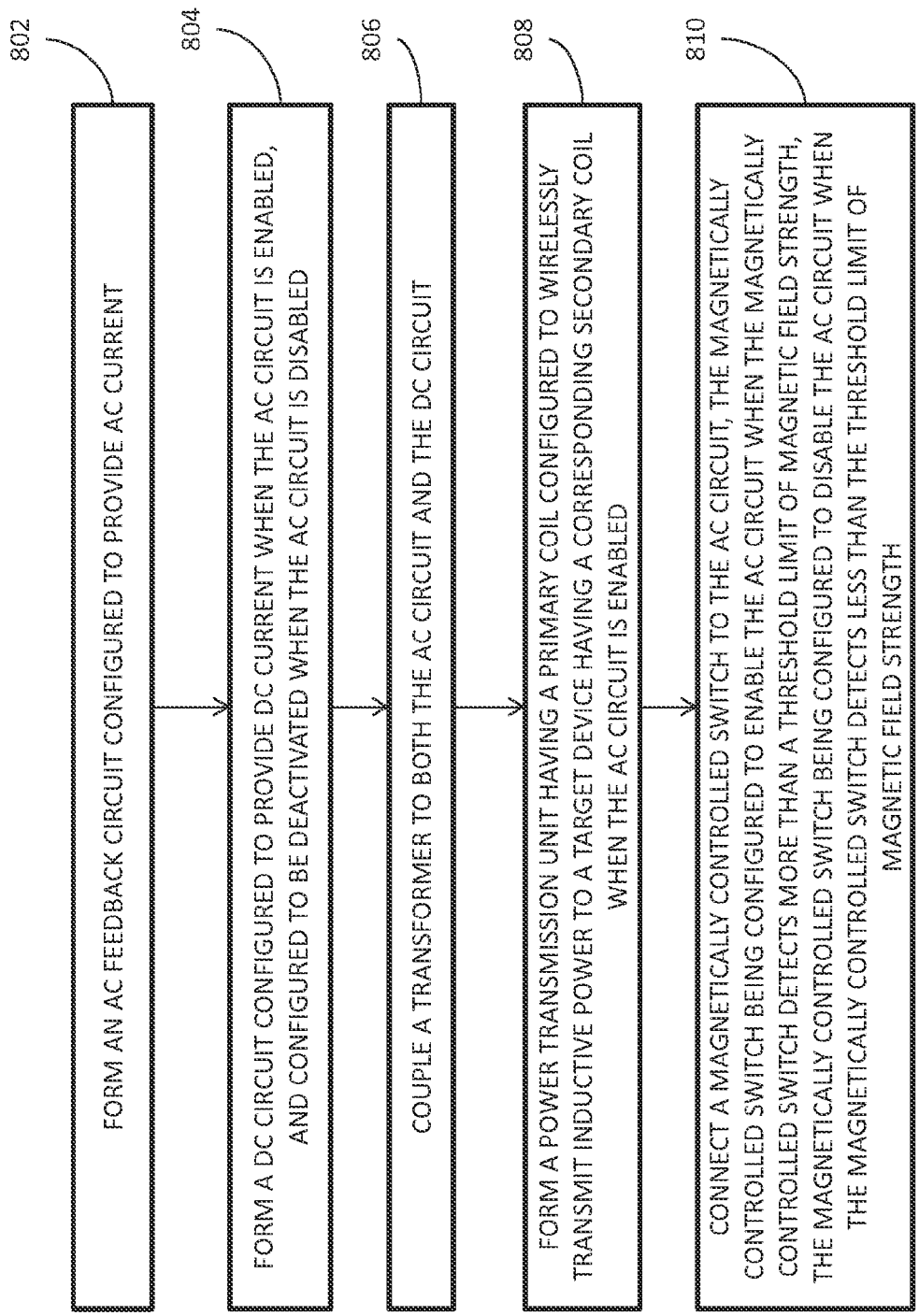
FIG. 8 is a process flow for forming a wireless charger for limiting vampiric energy toss, according to an embodiment.

FIG. 8 is a process flow for forming a wireless charger for limiting vampiric energy loss, according to an embodiment. In operation 802, an AC feedback circuit configured to provide AC current is formed. In operation 804, a DC circuit is formed that is configured to provide DC current when the AC circuit is enabled, and configured to be deactivated when the AC circuit is disabled. In operation 806, a transformer is coupled to both the AC circuit and the DC circuit. In operation 808, a power transmission unit is formed having a primary coil configured to wirelessly transmit inductive power to a target device having a corresponding secondary coil when the AC circuit is enabled. In operation 810, a magnetically controlled switch is connected to the AC circuit, the magnetically controlled switch being configured to enable the AC circuit when the magnetically controlled switch detects more than a threshold limit of magnetic field strength, the magnetically controlled switch being configured to disable the AC circuit when the magnetically controlled switch detects less than the threshold limit of magnetic field strength.

Figure 9:
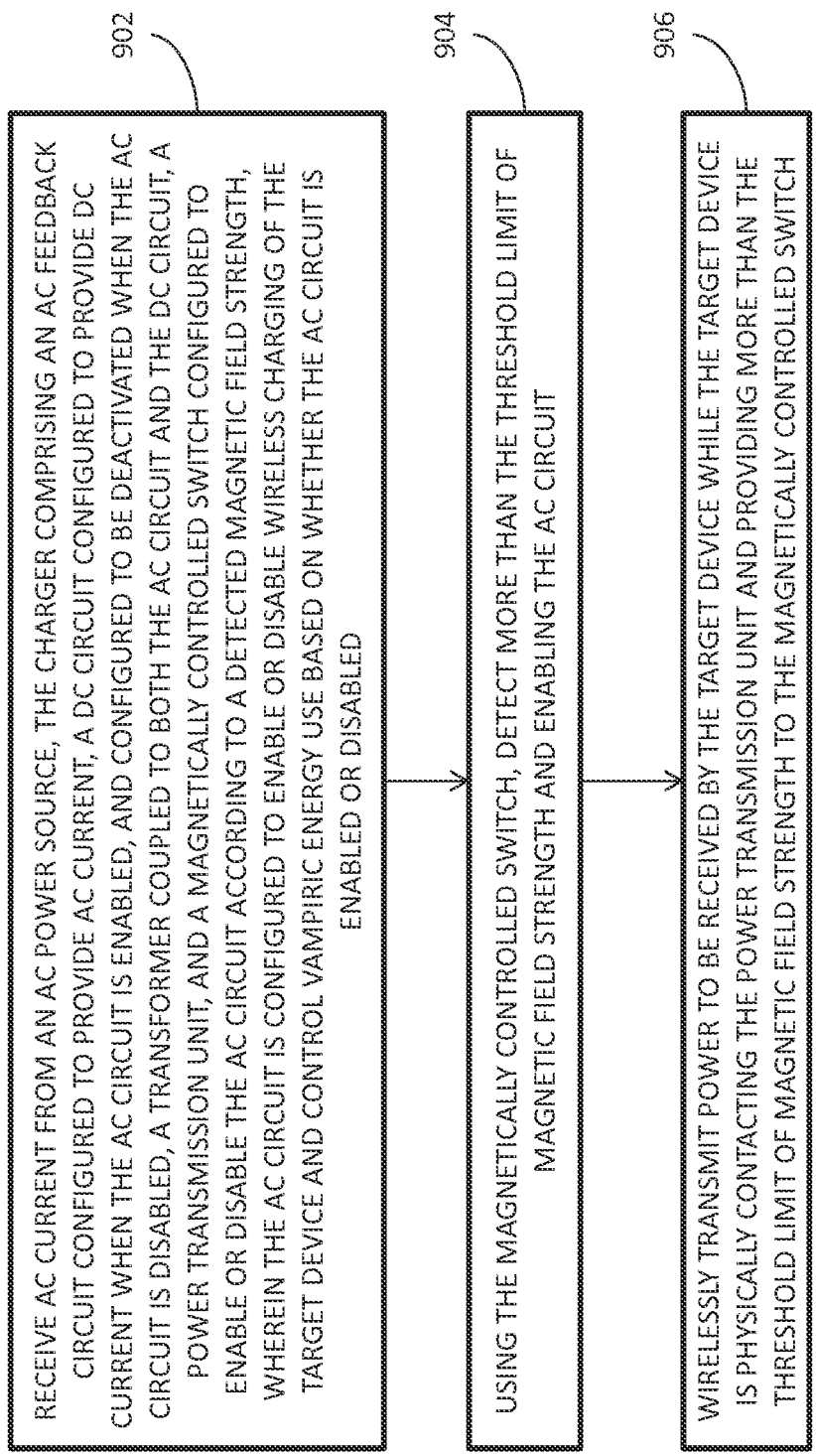
FIG. 9 is a process flow for limitation of vampiric energy loss using a wireless charger, according to an embodiment.

FIG. 9 is a process flow for limitation of vampiric energy loss using a wireless charger, according to an embodiment. In operation 902, using the charger, AC current is received from an AC power source, the charger comprising an AC feedback circuit configured to provide AC current, a DC circuit configured to provide DC current when the AC circuit is enabled, and configured to be deactivated when the AC circuit is disabled, a transformer coupled to both the AC circuit and the DC circuit, a power transmission unit, and a magnetically controlled switch configured to enable or disable the AC circuit according to a detected magnetic field strength. The AC circuit is configured to enable or disable wireless charging of the target device and control vampiric energy use based on whether the AC circuit is enabled or disabled.

In operation 904, using the magnetically controlled switch, more than the threshold limit of magnetic field strength is detected, and the AC circuit is enabled.

In operation 906, using the charger, power is wirelessly transmitted to be received by the target device while the target device is physically contacting the power transmission unit and providing more than the threshold limit of magnetic field strength to the magnetically controlled switch.

In an embodiment, a wireless charger configured to control vampiric energy losses is provided. The charger includes an AC feedback circuit configured to provide AC current, and a DC circuit configured to provide DC current when the AC circuit is enabled, and configured to be deactivated when the AC circuit is disabled. The charger further includes a transformer coupled to both the AC circuit the DC circuit, and a power transmission unit having a primary coil configured to wirelessly transmit power to a target device having a corresponding secondary coil when the AC circuit is enabled. The charger also includes a magnetically controlled switch that is connected to the AC circuit, the magnetically controlled switch being configured to enable the AC circuit when the magnetically controlled switch detects more than a threshold limit of magnetic field strength, and the magnetically controlled switch being configured to disable the AC circuit when the magnetically controlled switch detects less than the threshold limit of magnetic field strength.

The AC circuit is configured to enable wireless charging of the target device and to limit vampiric energy losses in the transformer, the DC circuit, the power transmission unit, and the target device when the AC circuit is disabled. In addition, the AC circuit is configured to enable wireless charging of the target device when the AC circuit is enabled.

The power transmission unit may be configured to support the target device. The magnetically controlled switch may be disposed at a position to detect more than the threshold limit of magnetic field strength when the target device is physically contacting the power transmission unit, and to detect less than the threshold limit of magnetic field strength when the target device is separated from the power transmission unit by more than a threshold distance. The threshold distance may be between 0.1 and 3 centimeters. The magnetically controlled switch may include a reed switch.

The target device may include the corresponding second coil configured to wirelessly receive power from the power transmission unit, and at least one magnet disposed at a position to align with the magnetically controlled switch when the target device is at a preferred orientation relative to the power transmission unit, the magnetically controlled switch being configured to receive the magnetic field from the magnet.

The charger may further include a charger enclosure that encloses the transformer, and a cable connected to the charger enclosure and the power transmission unit, wherein the cable includes part of the AC circuit and part of the DC circuit. The target device may include at least one electromagnet positioned to align with the magnetically controlled switch when the target device is at a preferred orientation relative to the power transmission unit.

In an embodiment, a method of forming a wireless charger configured to control vampiric energy losses includes forming an AC feedback circuit configured to provide AC current and forming a DC circuit configured to provide DC current when the AC circuit is enabled, and configured to be deactivated when the AC circuit is disabled. The method further includes coupling a transformer to both the AC circuit and the DC circuit, and forming a power transmission unit having a primary coil configured to wirelessly transmit inductive power to a target device having a corresponding secondary coil when the AC circuit is enabled. The method further includes connecting a magnetically controlled switch to the AC circuit, the magnetically controlled switch being configured to enable the AC circuit when the magnetically controlled switch detects more than a threshold limit of magnetic field strength, the magnetically controlled switch being configured to disable the AC circuit when the magnetically controlled switch detects less than the threshold limit of magnetic field strength.

The AC circuit is configured to enable wireless charging of the target device and to limit vampiric energy losses in the transformer, the DC circuit, the power transmission unit, and the target device when the AC circuit is disabled. In addition, the AC circuit is configured to enable wireless charging of the target device when the AC circuit is enabled.

The power transmission unit may be configured to support the target device. The magnetically controlled switch may be disposed at a position to detect more than the threshold limit of magnetic field strength when the target device is physically contacting the power transmission unit, and to detect less than the threshold limit of magnetic field strength when the target device is separated from the power transmission unit by more than a threshold distance.

The magnetically controlled switch may include a reed switch. The target device may include the corresponding second coil configured to wirelessly receive power from the power transmission unit, and at least one magnet disposed at a position to align with the magnetically controlled switch when the target device is at a preferred orientation relative to power transmission unit, the magnetically controlled switch being configured to receive the magnetic field from the magnet.

The charger may further include a charger enclosure that encloses the transformer, and a cable connected to the charger enclosure and the power transmission unit, wherein the cable includes part of the AC circuit and part of the DC circuit.

The target device may include at least one electromagnet positioned to align with the magnetically controlled switch when the target device is at a preferred orientation relative to the power transmission unit.

In an embodiment, a method of preventing vampiric power loss in a wireless charger for a target device is provided. The method includes receiving AC current from an AC power source, the charger including an AC feedback circuit configured to provide AC current, and a DC circuit configured to provide DC current when the AC circuit is enabled, and configured to be deactivated when the AC circuit is disabled. The charger further includes a transformer coupled to both the AC circuit and the DC circuit, and a power transmission unit having a primary coil configured to wirelessly transmit inductive power to a target device having a corresponding secondary coil when the AC circuit is enabled. The charger further includes a magnetically controlled switch that is connected to the AC circuit. The magnetically controlled switch may be configured to enable the AC circuit when the magnetically controlled switch detects more than a threshold limit of magnetic field strength, and the magnetically controlled switch may be configured to disable the AC circuit when the magnetically controlled switch detects less than the threshold limit of magnetic field strength. The AC circuit is configured to enable wireless charging of the target device and to limit vampiric energy losses in the transformer, the DC circuit, the power transmission unit, and the target device when the AC circuit is disabled. The AC circuit is further configured to enable wireless charging of the target device when the AC circuit is enabled.

The method further includes using the magnetically controlled switch to detect more than the threshold limit of magnetic field strength and enabling the AC circuit. The method also includes wirelessly transmitting power to be received by the target device while the target device is physically contacting the power transmission unit and providing more than the threshold limit of magnetic field strength to the magnetically controlled switch.

The method may further include using the magnetically controlled switch to detect less than the threshold limit of magnetic field strength. The method may also include using the magnetically controlled switch to disable the AC circuit and limit vampiric energy losses in the transformer, the DC circuit, the power transmission unit, and the target device. The magnetically controlled switch may detect less than the threshold limit of magnetic field strength when the target device is separated from the charger by more than a threshold distance, which may be between 0.1 and 3 centimeters. The method may further include supporting the target device on an upper surface of the power transmission unit.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A wireless charger configured to control vampiric energy losses, the charger comprising:
    an AC feedback circuit configured to provide AC current;
    a DC circuit configured to provide DC current when the AC circuit is enabled, and configured to be deactivated when the AC circuit is disabled;
    a transformer coupled to both the AC circuit and the DC circuit; a power transmission unit having a primary coil configured to wirelessly transmit power to a target device having a corresponding secondary coil when the AC circuit is enabled; and
    a magnetically controlled switch that is connected to the AC circuit, the magnetically controlled switch being configured to enable the AC circuit when the magnetically controlled switch detects more than a threshold limit of magnetic field strength, and the magnetically controlled switch being configured to disable the AC circuit when the magnetically controlled switch detects less than the threshold limit of magnetic field strength,
wherein the AC circuit is configured to enable wireless charging of the target device and to limit vampiric energy losses in the transformer, the DC circuit, the power transmission unit, and the target device when the AC circuit is disabled, and wherein the AC circuit is configured to enable wireless charging of the target device when the AC circuit is enabled.

2. The charger of claim 1, wherein the power transmission unit is configured to support the target device.

3. The charger of claim 1, wherein the magnetically controlled switch is disposed at a position to detect more than the threshold limit of magnetic field strength when the target device is physically contacting the power transmission unit, and to detect less than the threshold limit of magnetic field strength when the target device is separated from the power transmission unit by more than a threshold distance.

4. The method of claim 3, wherein the threshold distance is between 0.1 and 3 centimeters.

5. The charger of claim 1, wherein the magnetically controlled switch includes a reed switch.

6. The charger of claim 1, wherein the target device includes
    the corresponding second coil configured to wirelessly receive power from the power transmission unit; and
    at least one magnet disposed at a position to align with the magnetically controlled switch when the target device is at a preferred orientation relative to the power transmission unit, the magnetically controlled switch being configured to receive the magnetic field from the magnet.

7. The charger of claim 5, further comprising
    a charger enclosure that encloses the transformer; and
    a cable connected to the charger enclosure and the power transmission unit, wherein the cable includes part of the AC circuit and part of the DC circuit.

8. The charger of claim 1, wherein the target device includes at least one electromagnet positioned to align with the magnetically controlled switch when the target device is at a preferred orientation relative to the power transmission unit.

9. A method of forming a wireless charger configured to control vampiric energy losses, the method comprising:
    forming an AC feedback circuit configured to provide AC current;
    forming a DC circuit configured to provide DC current when the AC circuit is enabled, and configured to be deactivated when the AC circuit is disabled;
    coupling a transformer to both the AC circuit and the DC circuit;
    forming a power transmission unit having a primary coil configured to wirelessly transmit inductive power to a target device having a corresponding secondary coil when the AC circuit is enabled; and
    connecting a magnetically controlled switch to the AC circuit, the magnetically controlled switch being configured to enable the AC circuit when the magnetically controlled switch detects more than a threshold limit of magnetic field strength, the magnetically controlled switch being configured to disable the AC circuit when the magnetically controlled switch detects less than the threshold limit of magnetic field strength,
wherein the AC circuit is configured to enable wireless charging of the target device and to limit vampiric energy losses in the transformer, the DC circuit, the power transmission unit, and the target device when the AC circuit is disabled, and wherein the AC circuit is configured to enable wireless charging of the target device when the AC circuit is enabled.

10. The method of claim 9, wherein the power transmission unit is configured to support the target device.

11. The method of claim 9, wherein the magnetically controlled switch is disposed at a position to detect more than the threshold limit of magnetic field strength when the target device is physically contacting the power transmission unit, and to detect less than the threshold limit of magnetic field strength when the target device is separated from the power transmission unit by more than a threshold distance.

12. The method of claim 9, wherein the magnetically controlled switch includes a reed switch.

13. The method of claim 9, wherein the target device includes
    the corresponding second coil configured to wirelessly receive power from the power transmission unit; and
    a least one magnet disposed at a position to align with the magnetically controlled switch when the target device is at a preferred orientation relative to power transmission unit, the magnetically controlled switch being configured to receive the magnetic field from the magnet.

14. The method of claim 9, wherein the wireless charger further includes
   a charger enclosure that encloses the transformer; and
   a cable connected to the charger enclosure and the power transmission unit, wherein the cable includes part of the AC circuit and part of the DC circuit.

15. The charger of claim 1, wherein the target device includes at least one electromagnet positioned to align with the magnetically controlled switch when the target device is at a preferred orientation relative to the power transmission unit.

16. A method of preventing vampiric power loss in a wireless charger for a target device, the method comprising:
   receiving AC current from an AC power source, the charger comprising
      an AC feedback circuit configured to provide AC current,
      a DC circuit configured to provide DC current when the AC circuit is enabled, and configured to be deactivated when the AC circuit is disabled,
      a transformer coupled to both the AC circuit and the DC circuit,
      a power transmission unit having a primary coil configured to wirelessly transmit inductive power to a target device having a corresponding secondary coil when the AC circuit is enabled, and
      a magnetically controlled switch that is connected to the AC circuit, the magnetically controlled switch being configured to enable the AC circuit when the magnetically controlled switch detects more than a threshold limit of magnetic field strength, and the magnetically controlled switch being configured to disable the AC circuit when the magnetically controlled switch detects less than the threshold limit of magnetic field strength,
      wherein the AC circuit is configured to enable wireless charging of the target device and to limit vampiric energy losses in the transformer, the DC circuit, the power transmission unit, and the target device when the AC circuit is disabled, and wherein the AC circuit is configured to enable wireless charging of the target device when the AC circuit is enabled;
   using the magnetically controlled switch, detecting more than the threshold limit of magnetic field strength and enabling the AC circuit; and
   wirelessly transmitting power to be received by the target device while the target device is physically contacting the power transmission unit and providing more than the threshold limit of magnetic field strength to the magnetically controlled switch.

17. The method of claim 16, further comprising:
   using the magnetically controlled switch, detecting less than the threshold limit of magnetic field strength; and
   using the magnetically controlled switch, disabling the AC circuit and limiting vampiric energy losses in the transformer, the DC circuit, the power transmission unit, and the target device.

18. The method of claim 16, wherein the magnetically controlled switch detects less than the threshold limit of magnetic field strength when the target device is separated from the charger by more than a threshold distance.

19. The method of claim 18, wherein the threshold distance is between 0.1 and 3 centimeters.

20. The method of claim 16, further comprising: supporting the target device on an upper surface of the power transmission unit.

* * * * *